(12) United States Patent
Eneau et al.

(10) Patent No.: US 6,916,155 B2
(45) Date of Patent: Jul. 12, 2005

(54) COOLING CIRCUITS FOR A GAS TURBINE BLADE

(75) Inventors: Patrice Eneau, Le Mee sur Seine (FR); Philippe Picot, Le Chatelet en Brie (FR)

(73) Assignee: SNECMA Moteurs, Paris (FR)

( * ) Notice: Subject to any disclaimer, the term of this patent is extended or adjusted under 35 U.S.C. 154(b) by 8 days.

(21) Appl. No.: 10/227,864

(22) Filed: Aug. 27, 2002

(65) Prior Publication Data

US 2003/0044278 A1 Mar. 6, 2003

(30) Foreign Application Priority Data

Aug. 28, 2001 (FR) .............................................. 01 11189

(51) Int. Cl.$^7$ ................................................ F01D 5/18
(52) U.S. Cl. ..................................... 416/97 R; 415/115
(58) Field of Search ............................ 416/97 R, 96 R; 415/115, 116

(56) References Cited

U.S. PATENT DOCUMENTS

| | | | |
|---|---|---|---|
| 4,767,268 A | * | 8/1988 | Auxier et al. ............. 416/97 R |
| 5,165,852 A | | 11/1992 | Lee et al. ................. 416/97 R |
| 5,356,265 A | | 10/1994 | Kercher ..................... 416/97 R |
| 5,720,431 A | * | 2/1998 | Sellers et al. ............. 416/97 R |
| 6,036,441 A | | 3/2000 | Manning et al. .......... 416/97 R |
| 6,206,638 B1 | | 3/2001 | Glynn et al. .............. 416/97 R |

FOREIGN PATENT DOCUMENTS

EP    0 661 414    7/1995

\* cited by examiner

*Primary Examiner*—Edward K. Look
*Assistant Examiner*—Richard A Edgar
(74) *Attorney, Agent, or Firm*—Oblon, Spivak, McClelland, Maier & Neustadt, P.C.

(57) ABSTRACT

A gas turbine blade for an airplane engine, comprising in its central portion at least a first central cooling circuit comprising at least first and second cavities extending radially on the concave side of the blade, at least one cavity extending on the convex side of the blade, an air admission opening at a radial end of the first concave side cavity for feeding the first central cooling circuit with cooling air, a first passage putting the other radial end of the first concave side cavity into communication with an adjacent radial end of the convex side cavity, a second passage putting the other radial end of the convex side cavity into communication with an adjacent radial end of the second concave side cavity, and outlet orifices opening out into the second concave side cavity and through the concave face of the blade.

23 Claims, 4 Drawing Sheets

COOLING CIRCUITS FOR A GAS TURBINE BLADE

BACKGROUND OF THE INVENTION

The present invention relates to improvements made to gas turbine blades for an airplane engine. More particularly, the invention relates to the cooling circuits of such blades.

It is known that moving blades of airplane gas turbine engines, in particular blades of high pressure turbines, are subjected to very high temperatures from combustion gases when the engine is in operation. These temperatures reach values that are well above those that can be withstood damage by the various pieces that come into contact with these gases, thereby limiting the lifetime of such pieces.

Furthermore, it is known that raising the temperature of the gases in a high pressure turbine improves the efficiency of an engine, and thus the ratio of engine thrust over the weight of an airplane propelled by the engine. Consequently, efforts are made so as to provide turbine blades that are capable of withstanding higher and higher temperatures.

In order to solve this problem, it is known to provide such blades with cooling circuits seeking to reduce the temperature of the blades. By means of such circuits, cooling air, generally inserted into the blade via its root, passes through the blade following a path defined by cavities formed inside the blade prior to being ejected via orifices opening through the surface of the blade.

However, it is often found that the heat exchange produced by this flow of cooling air in the cavities of the blade is not uniform and gives rise to temperature gradients that penalize blade lifetime.

Furthermore, exhausting cooling air through outlet positions in the convex face is difficult. The speeds that apply over the convex face of the blade are high so that the losses that result from mixing between the cooling air and the air in the external stream are high and spoil the efficiency of the gas turbine.

OBJECT AND SUMMARY OF THE INVENTION

The present invention thus seeks to mitigate such drawbacks by proposing improvements to gas turbine blades, and more particularly to the cooling circuits thereof, so as to obtain a substantially constant temperature field along the cooled zones of the blade while avoiding exhausting through the convex face.

To this end, the invention provides a gas turbine blade for an airplane engine, the blade comprising in its central portion at least a first central cooling circuit comprising at least first and second cavities extending radially on the concave side of the blade, at least one cavity extending on the convex side of the blade, an air admission opening at a radial end of the first concave side cavity for feeding the first central cooling circuit with cooling air, a first passage putting the other radial end of the first concave side cavity into communication with an adjacent radial end of the convex side cavity, a second passage putting the other radial end of the convex side cavity into communication with an adjacent radial end of the second concave side cavity, and outlet orifices opening out into the second concave side cavity and through the concave face of the blade.

A variety of circuits of this type can be positioned in the central portion of the blade so as to cool it. These identical circuits that operate in similar manner lead to temperature being uniformly distributed.

The cavity extending radially beside the convex face of the blade possesses an aspect ratio that is large, thus serving to increase heat transfer levels beside the convex face. This heat transfer as amplified by the presence of the baffles makes it possible to avoid exhausting through the convex face.

In addition, for a rotary blade, since the cooling circuit is fed from the root of the blade, air circulation in the radial direction in the concave side cavities takes place from the root towards the tip. Because of the effects of Coriolis force, the air tends to be pressed against the walls of the cavities that are closest to the outer concave face of the blade, thus providing better heat transfer with the hottest portion of the blade wall. In the convex side cavity, the air flows from the tip towards the root of the blade. The effect of the Coriolis force also serves to improve heat transfer.

Furthermore, in order to make the blade by molding, cores for forming the concave and convex side cavities are interconnected at their ends by connection portions that serve to form the passages between the cavities. Thus, the positioning of the concave side core relative to the convex side core is readily controlled, ensuring that wall thicknesses are properly complied with when the blade is cast.

According to a feature of the invention, a plurality of independent central cooling circuits having at least two concave side cavities communicating with at least one convex side cavity may be provided

BRIEF DESCRIPTION OF THE DRAWINGS

Other characteristics and advantages of the present invention appear from the following description made with reference to the accompanying drawings which show an embodiment that is not limiting in any way. In the figures.

DETAILED DESCRIPTION OF AND EMBODIMENT

Figure 1:
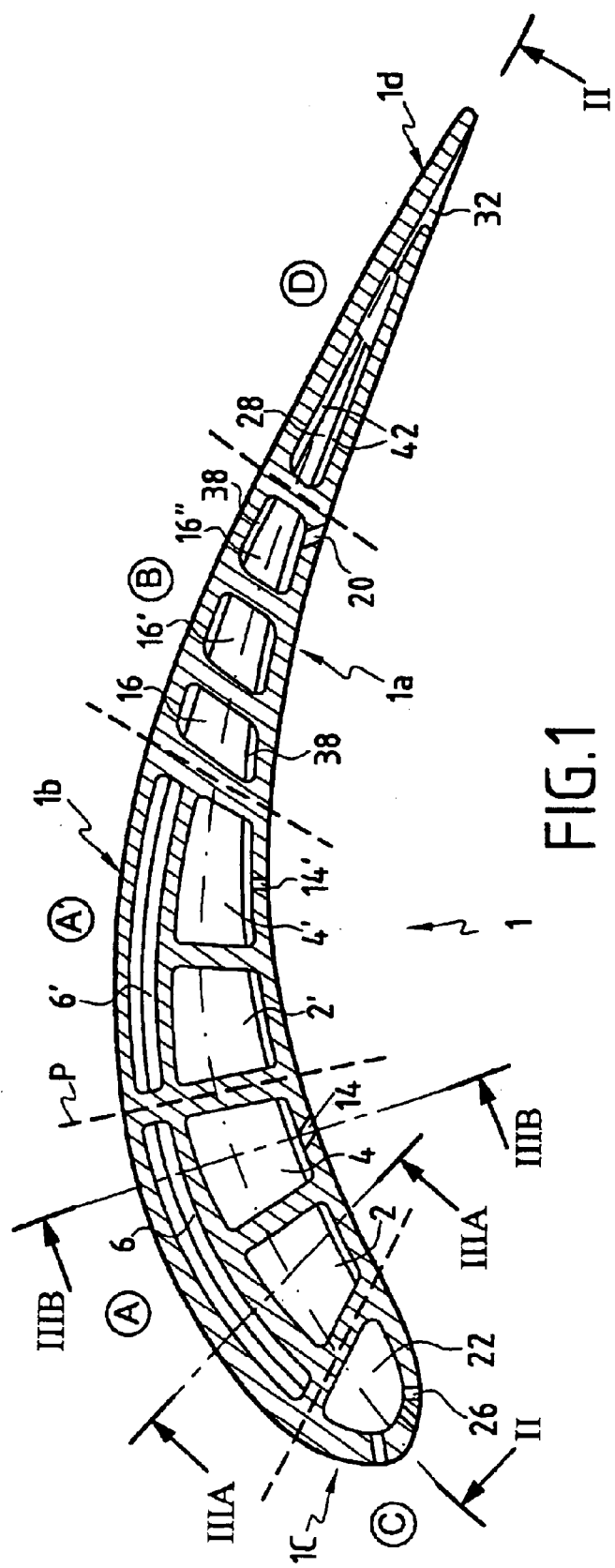
FIG. 1 is a section view of a blade fitted with various cooling circuits in an embodiment of the invention.

With reference to FIG. 1, there can be seen a gas turbine blade 1 of an airplane engine constituting an embodiment of the present invention, having in its central portion at least a central first cooling circuit A.

The central portion of the blade 1 preferably comprises two central cooling circuits A and A' disposed substantially symmetrically about a transverse plane P so as to obtain a substantially uniform temperature field along the cooled zones of the blade, i.e. a field without any steep temperature gradient. This characteristic serves to increase the lifetime of the blade.

Each central cooling circuit A and A' has at least first and second cavities (respectively) 2, 2', and 4, 4' extending beside the concave face 1a of the blade 1, and at least one cavity 6, 6' extending beside the convex face 1b of the blade.

Figure 2:
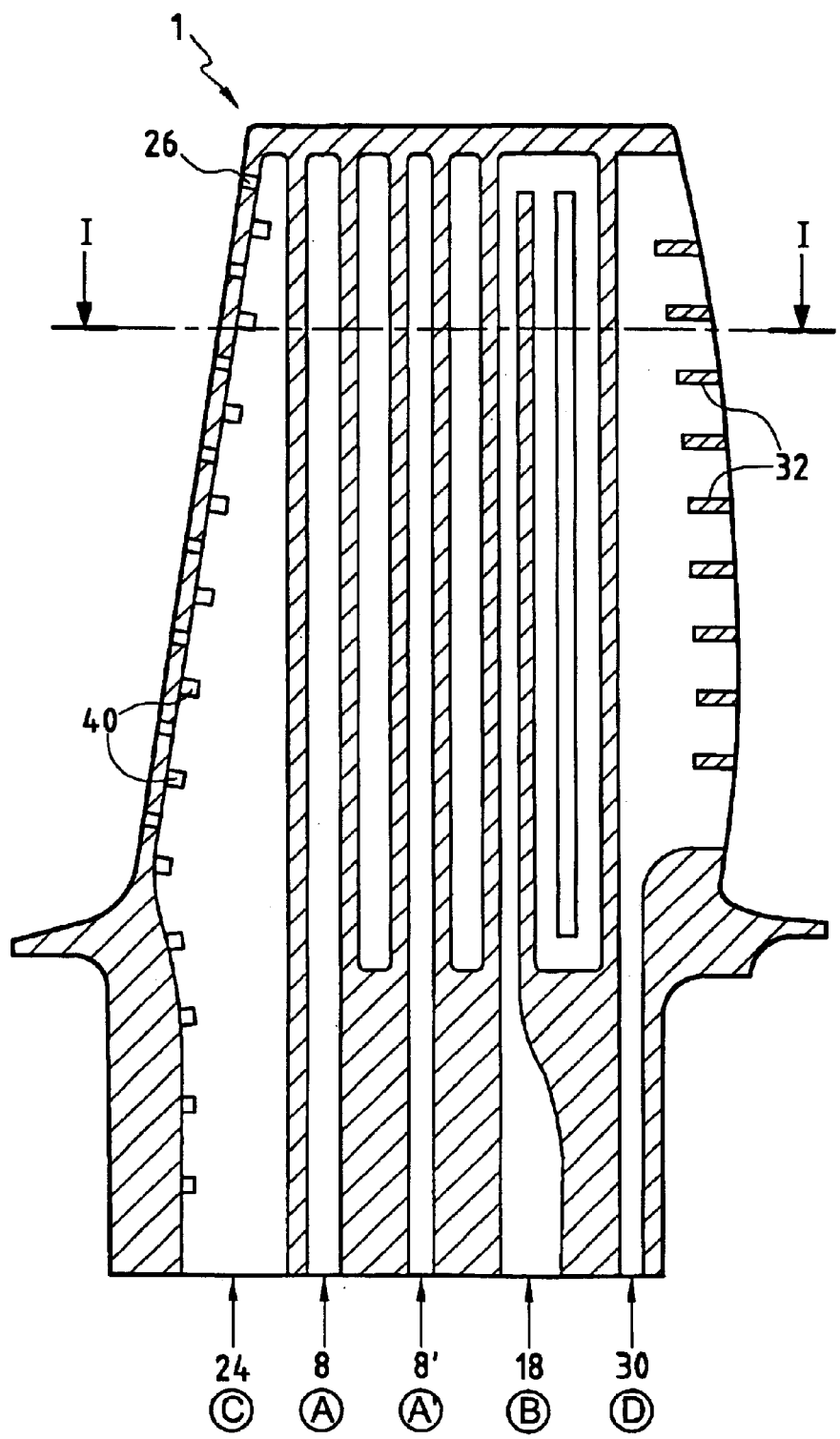
FIG. 2 is a section view of FIG. 1 on section line II—II.

As shown more clearly in FIG. 2, an air admission opening 8, 8' is provided at a radial end of the first concave side cavity 2, 2' (i.e. in the vicinity of the root of the blade) to feed each central cooling circuit A, A' with cooling air.

Figure 3A:
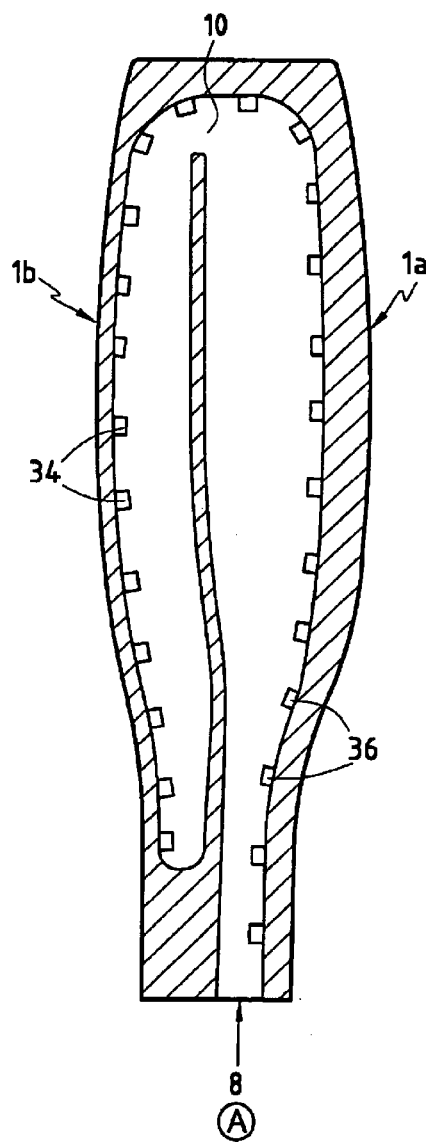
FIGS. 3A and 3B are section views of FIG. 1 respectively on section lies IIIA—IIIA and IIIB—IIIB.
Figure 3B:
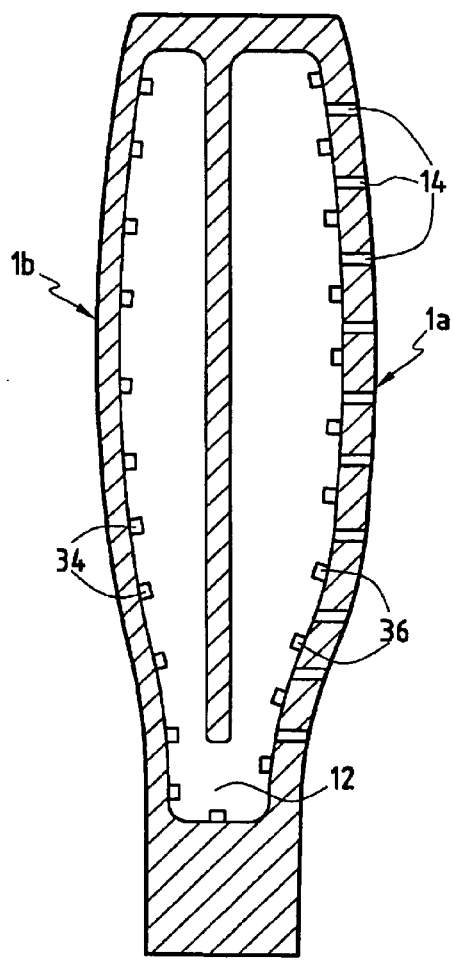

In addition, with reference to FIGS. 3A and 3B, it can be seen that a first passage 10 puts the other radial end of the first concave side cavity 2 (i.e. the end near the tip of the blade) into communication with an adjacent radial end of the convex side cavity 6 of the cooling circuit A. A second passage 12 is also provided in the vicinity of the root of the blade to put the other radial end of the convex side cavity 6 into communication with an adjacent radial end of the second concave side cavity 4. Similar communication is established between the cavities 2', 6', and 4' of the circuit A'.

Finally, each central cooling circuit A, A' has outlet orifices 14, 14' for cooling air that open out into the second concave side cavity 4, 4' and through the concave face 1a of the blade 1.

Thus, cooling air feeding the central cooling circuit(s) A, A' travels along the concave side cavities 2, 2', and 4, 4' in a radial direction that is opposite to the direction in which it travels along the convex side cavities 6, 6'.

Advantageously, the convex side cavity 6, 6' of each central cooling circuit A, A' has an aspect ratio that is large so as to increase internal heat transfer. A cooling cavity is considered as having an aspect ratio that is large when, in cross-section, it presents one dimension (length) that is at least three times greater than the other dimension (width).

Also advantageously, the convex side cavity has baffles 34 on its outer wall beside the convex face, and the first and second concave side cavities of the central cooling circuit(s) A, A' are likewise provided with baffles 36 on their outer walls beside the concave face.

The baffles 34 and 36 are in the form of portions in relief positioned on the walls of the cavity extending across the flow of cooling air. They thus serve to disturb the flow of air traveling along these cavities, thereby encouraging heat exchange while benefiting from optimized head losses.

Furthermore, and still with reference to FIG. 1, it can be seen that the blade 1 also has at least one additional second cooling circuit B that is independent from the central cooling circuit(s) A, A'.

This second cooling circuit B comprises at least one cavity 16, and preferably more, e.g. three cavities 16, 16', 16" situated in the rear portion of the blade 1, an air admission opening 18 at the root of the blade for feeding the second cooling circuit, and outlet orifices 20 opening through the concave face 1a of the blade. Air is admitted into the cavity 16 and passages put the cavities 16 and 16' into communication close to the tip of the blade, and the cavities 16' and 16" into communication close to the root of the blade. The outlet orifices 20 open out into the cavity 16".

In this way, the second cooling circuit B serves to cool the rear portion of the blade 1. Furthermore, in order to improve heat transfer along the concave and convex side walls of the cavities 16, 16', 16", they advantageously have baffles 38 positioned facing one another on their inside walls.

Additional third and fourth cooling circuits (respectively C and D) that are independent from the first and second cooling circuits serve to cool the leading edge 1c and the trailing edge 1d respectively of the blade 1.

The third cooling circuit C is constituted by at least one cavity 22 situated in the vicinity of the leading edge 1c of the blade and an air admission opening 24 at one radial end of the leading edge cavity 22 beside the root of the blade for feeding cooling air to this circuit. Outlet orifices 26 open out into the cavity 22 and through the leading edge of the blade. They enable a film of cooling air to be formed on the outside wall of the leading edge.

The leading edge cavity 22 is preferably provided with baffles 40 on its wall beside the leading edge of the blade so as to increase heat exchange along this wall.

The fourth cooling circuit D is made up of at least one cavity 28 situated beside the trailing edge 1d of the blade 1, and having an air, admission opening 30 at one radial end of the trailing edge cavity 28 beside the root of the blade for feeding this cooling circuit with air. Outlet orifices 32 open out into the trailing edge cavity and through the trailing edge 1d so as to cool it.

Advantageously, the trailing edge cavity 28 of the fourth cooling circuit has baffles 42 on its concave and convex side walls so as to improve heat transfer along these walls.

The way in which the blade is cooled stems obviously from the above description and it is described briefly below with reference more particularly to FIG. 4.

Figure 4:
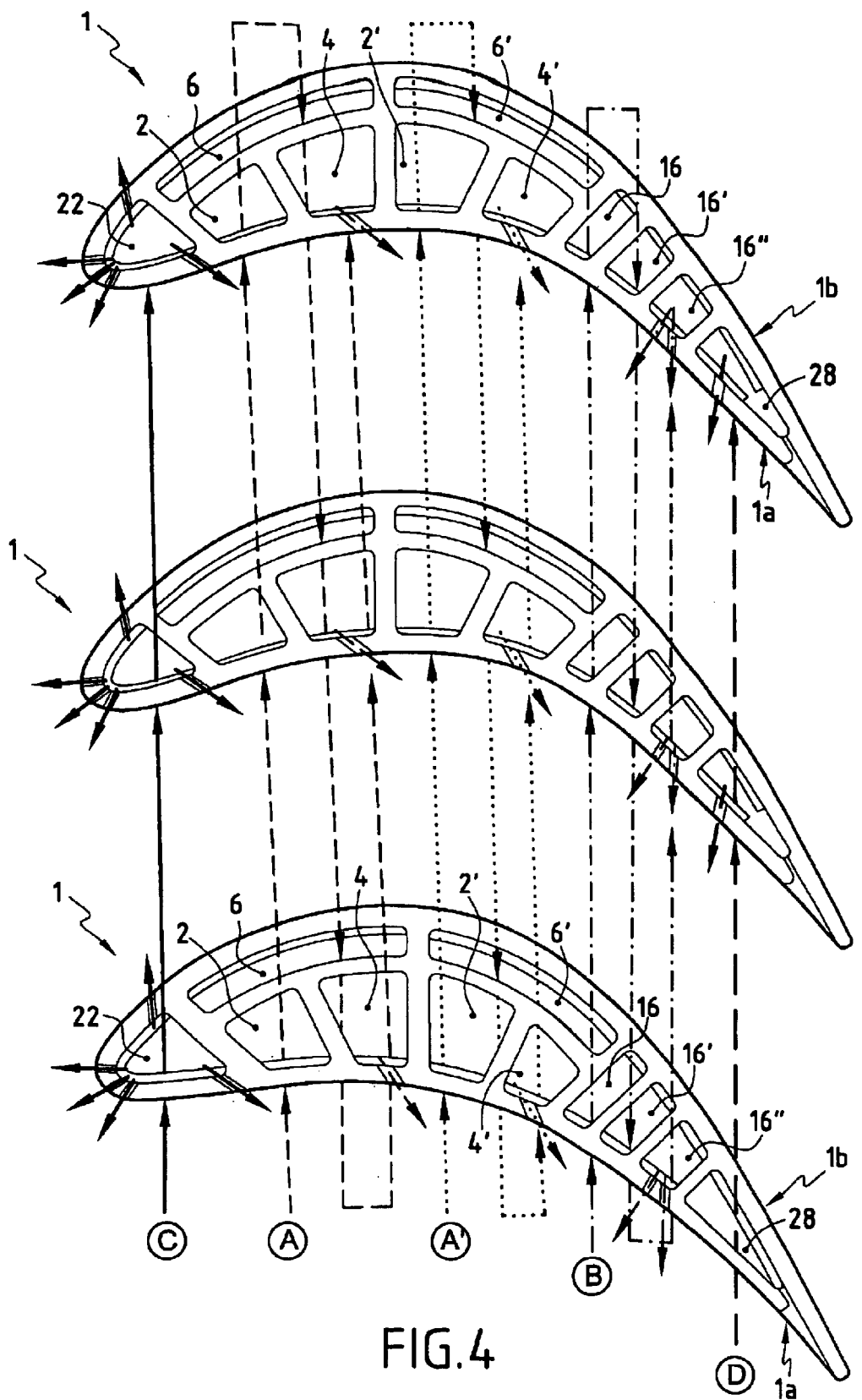
FIG. 4 shows the cooling air circulation associated with the various cooling circuits of the FIG. 1 blade.

FIG. 4 is a diagram showing how cooling air circulates along the various circuits A to D of the blade 1. These four circuits are independent of one another since each of them has a direct cooling air feed.

The central, first cooling circuit A is fed with cooling air via the first concave side cavity 2. The cooling air then travels along the convex side cavity 6 and then along the second concave side cavity 4 prior to being exhausted through the concave face of the blade via the outlet orifices 14 from said cavity.

When two central cooling circuits A and A' are advantageously provided, cooling air circulation in the circuit A' takes place in similar manner.

Thus, depending on the particular disposition of the central cooling circuit(s), cooling air moves upwards (from the root towards the tip of the blade) in the concave side cavities and moves downwards in the convex side cavity.

Air circulation in the opposite direction on the concave side and on the convex side in the circuits A and A', and the advantageous presence of two cooling circuits disposed substantially symmetrically in the central portion of the blade contribute to obtaining a temperature field that is substantially uniform, i.e. without any steep temperature gradient. Blade lifetime is thus increased.

Furthermore, the cooling circuit(s) A, A' has/have no air exhaust outlet through the convex face of the blade, thereby avoiding problems with air distribution at high speeds.

Because cooling air flows from the root towards the tip of the blade in the concave side cavities, it is pressed against the outer walls of these cavities by the effect of the Coriolis force. Heat transfer is thus encouraged along these outer walls, thereby providing better cooling of the hot outer wall of the concave face of the blade.

In addition, the cooling air moves downwards in the convex side cavities. As a result the effects of the Coriolis force serve likewise to benefit from increased heat exchange, thereby obtaining better cooling of the outer wall of the convex face of the blade.

Since the convex face of the blade is cooled by convex side cavities having an aspect ratio that is large, this serves to increase the external heat transfer level, which level is also amplified by the presence of baffles on the outer walls of the cavities.

Furthermore, the rear portion of the blade 1 is cooled by the second cooling circuit B which advantageously comprises three cavities 16, 16', and 16". As shown in FIG. 4, the cooling air feeds one cavity 16, doubles back at the lip of the blade along the cavity 16', after which it feeds the upwardly extending cavity 16" prior to being exhausted through the concave face of the blade 1 via the outlet orifices 20.

The leading edge 1c of the blade 1 is cooled by the leading edge cavity 22 which is fed directly with cooling air, and the trailing edge 1d is cooled by the trailing edge cavity 28 which is likewise fed directly with cooling air.

The blade 1 in this embodiment of the invention is made by molding, with the locations of the cavities being conventionally defined by cores placed parallel to one another in the mold prior to casting the metal. In the circuits A and A', these cores are interconnected at their ends by connection portions which serve to define the passages between the cavities. Since core positioning is easily controlled, it can be ensured that the wall thicknesses are properly complied with when a blade is cast.

Naturally, the present invention is not limited to the embodiments described above and on the contrary it covers any variant. In particular, such cooling circuits can be installed both in fixed blades and in moving blades.

What is claimed is:

1. A gas turbine blade for an airplane engine, the blade comprising in its central portion first and second central cooling circuits, each central cooling circuits comprising at least first and second cavities extending radially on a concave side of the blade, at least one cavity extending on a convex side of the blade, an air admission opening at a radial end of the first concave side cavity for feeding the central cooling circuit with cooling air, a first passage putting the other radial end of the first concave side cavity into communication with an adjacent radial end of the convex side cavity, a second passage putting the other radial end of the convex side cavity into communication with an adjacent radial end of the second concave side cavity, and outlet orifices opening out into the second concave side cavity and through a concave face of the blade, wherein the first and second central cooling circuits are substantially symmetrical to each other about a plane transverse to the blade.

2. A blade according to claim 1, further comprising at least an additional third cooling circuit independent of the first central cooling circuit, the third cooling circuit comprising at least one cavity situated in the rear portion of the blade, an air admission opening at a radial end of the cavity to feed the third cooling circuit, and outlet orifices opening out into the cavity and through the concave face of the blade.

3. A blade according to claim 2, further comprising at least an additional fourth cooling circuit independent of the first and third cooling circuits, the fourth cooling circuit comprising at least a cavity situated in the vicinity of the leading edge of the blade, an air admission opening at a radial end of the leading edge cavity to feed the fourth cooling circuit, and outlet orifices opening out into the leading edge cavity and through the leading edge of the blade.

4. A blade according to claim 3, further comprising at least an additional fifth cooling circuit independent of the first, third, and fourth cooling circuits, the fifth cooling circuit comprising at least a cavity situated in the vicinity of the trailing edge of the blade, an air admission opening at a radial end of the trailing edge cavity to feed the fifth cooling circuit, and outlet orifices opening out into said trailing edge cavity and through the trailing edge of the blade.

5. A blade according to claim 4, wherein the trailing edge cavity of the fifth cooling circuit has baffles on its concave and convex side walls so as to increase heat transfer along said walls.

6. A blade according to claim 3, wherein the leading edge cavity of the fourth cooling circuit has baffles on its wall beside the leading edge of the blade so as to increase heat transfer along said wall.

7. A blade according to claim 2, wherein the cavity of the third cooling circuit has baffles placed facing one another on its concave and convex side walls in such a manner as to improve heat exchange along said walls.

8. A blade according to claim 1, wherein the convex side cavity of the first cooling circuit has an aspect ratio that is large so as to increase internal heat transfer.

9. A blade according to claim 1, wherein the convex side cavity of the first cooling circuit includes baffles on its outer wall beside the convex face so as to increase heat transfer along said wall while maintaining optimized head losses.

10. A blade according to claim 1, wherein the first and second concave side cavities of the first cooling circuit include baffles on their outer wall beside the concave face so as to increase heat transfer along said walls while maintaining optimized head losses.

11. A blade according to claim 1, wherein said first and second central cooling circuits provide a temperature field that is substantially uniform in the central portion of the blade.

12. A blade according to claim 1, the blade being made by molding, the locations of the concave side and convex side cavities being defined by cores placed in parallel and interconnected at their ends so as to define passages between the cavities and so as to guarantee that the cores are properly positioned relative to one another.

13. A gas turbine blade for an airplane engine, the blade comprising:
   a first central cooling circuit comprising at least first and second cavities extending radially on a concave side of the blade;
   at least one cavity extending on a convex side of the blade;
   an air admission opening at a radial end of the first concave side cavity in communication with the first central cooling circuit;
   a first passage putting the other radial end of the first concave side cavity into communication with an adjacent radial end of the convex side cavity;
   a second passage putting the other radial end of the convex side cavity into communication with an adjacent radial end of the second concave side cavity;
   outlet orifices opening out into the second concave side cavity and through a concave face of the blade;
   a second cooling circuit independent of the first central cooling circuit, the second cooling circuit comprising at least one cavity situated in the rear portion of the blade, an air admission opening at a radial end of the cavity to feed the second cooling circuit, and outlet orifices opening out into the cavity and through the concave face of the blade;
   a third cooling circuit independent of the first and second cooling circuits, the third cooling circuit comprising at least a cavity situated in the vicinity of the leading edge of the blade, an air admission opening at a radial end of the leading edge cavity to feed the third cooling circuit, and outlet orifices opening out into the leading edge cavity and through the leading edge of the blade; and
   a fourth cooling circuit independent of the first, second, and third cooling circuits, the fourth cooling circuit comprising at least a cavity situated in the vicinity of the trailing edge of the blade, an air admission opening at a radial end of the trailing edge cavity to feed the fourth cooling circuit, and outlet orifices opening out into said trailing edge cavity and through the trailing edge of the blade.

14. A blade according to claim 13, wherein the trailing edge cavity of the fourth cooling circuit has baffles on its concave and convex side walls so as to increase heat transfer along said walls.

15. The gas turbine blade of claim 1, wherein the at least one cavity extending on the convex side of the blade is adjacent to the at least first and second cavities.

16. The gas turbine blade of claim 1, wherein the at least one cavity extending on the convex side of the blade is separated in a camberwise direction from the at least first and second cavities by a rib.

17. A gas turbine blade for a turbomachinery having first and second central cooling circuits, each central cooling circuits comprising:
- a first cavity and a second cavity extending radially on a concave side of the blade;
- a third cavity extending radially on a convex side of the blade, the third cavity being separated from the first and second cavities by a wall extending radially and spanning in a direction from a leading edge to a trailing edge of the blade;
- a cooling air supply opening at a radial end of the first cavity;
- a first passage connecting another radial end of the first cavity to a radial end of the third cavity;
- a second passage connecting the other radial end of the third cavity to a radial end of the second cavity; and
- an outlet orifice in a concave face of the blade in communication with the second cavity, wherein the first and second central cooling circuits are substantially symmetrical to each other about a plane transverse to the blade.

18. The gas turbine blade according to claim 17, wherein a cross section of the third cavity has a length that is at least three times a width thereof.

19. The gas turbine blade of claim 17, wherein the at least one cavity extending on the convex side of the blade is adjacent to the at least first and second cavities.

20. The gas turbine blade of claim 17, wherein the wall is a rib in the blade.

21. A gas turbine blade for a turbomachinery, the blade having a radial direction extending from a root to a tip of the blade, a midline direction extending from a leading edge to a trailing edge of the blade along a line midway between a convex face and a concave face of the blade, a camber direction extending from the concave to the convex faces and being perpendicular to the radial and midline directions, and first and second central cooling circuits, each of the cooling circuits comprising:
- first and second cavities extending along the concave face in the radial direction, the first and second cavities having cross sectional areas extending along the midline and camber directions;
- a third cavity extending radially along the convex face in the radial direction, the third cavity having a cross sectional area extending along the midline and camber directions of the blade;
- a cooling air supply opening at a radial end of the first cavity;
- a first passage connecting another radial end of the first cavity to a radial end of the third cavity;
- a second passage connecting the other radial end of the third cavity to a radial end of the second cavity; and
- an outlet orifice in said concave face in communication with the second cavity, wherein a first portion of the cross sectional area of the third cavity has midline coordinate points that are the same as midline coordinate points of the cross sectional area of the first cavity, and a second portion of the cross sectional area of the third cavity has midline coordinate points that are the same as midline coordinate points of the cross sectional area of the second cavity, wherein the first and second central cooling circuits are substantially symmetrical to each other about a plane transverse to the blade.

22. The gas turbine blade according to claim 21, wherein a cross section of the third cavity has a length that is at least three times a width thereof.

23. The gas turbine blade of claim 21, wherein the third cavity is separated in the camber direction from the first and second cavities by a rib.

* * * * *